United States Patent
Huang et al.

(10) Patent No.: US 10,707,691 B2
(45) Date of Patent: Jul. 7, 2020

(54) ELECTRONIC DEVICE AND CHARGING METHOD THEREOF

(71) Applicant: ASUSTeK COMPUTER INC., Taipei (TW)

(72) Inventors: Yi-Ming Huang, Taipei (TW); Feng-Chi Shen, Taipei (TW); Chien-Chung Lo, Taipei (TW); Shin-Hong Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/837,057

(22) Filed: Dec. 11, 2017

(65) Prior Publication Data

US 2018/0166902 A1    Jun. 14, 2018

(30) Foreign Application Priority Data

Dec. 13, 2016    (TW) .............................. 105141265 A

(51) Int. Cl.

| H02J 7/00 | (2006.01) |
|---|---|
| H02M 3/07 | (2006.01) |
| H02M 3/158 | (2006.01) |
| H02M 1/00 | (2006.01) |

(52) U.S. Cl.
CPC ............ *H02J 7/0077* (2013.01); *H02J 7/00* (2013.01); *H02M 3/07* (2013.01); *H02M 3/158* (2013.01); *H02J 2207/20* (2020.01); *H02M 2001/007* (2013.01); *H02M 2003/072* (2013.01); *Y02B 40/90* (2013.01)

(58) Field of Classification Search
CPC .......... H02J 7/0077; H02J 7/00; H02J 7/0052; H02M 3/07; H02M 3/158
USPC ................................... 320/101, 164
See application file for complete search history.

(56) References Cited

U.S. PATENT DOCUMENTS

| 2013/0069614 | A1 | 3/2013 | Tso et al. |
| 2014/0184164 | A1 | 7/2014 | Niculae et al. |
| 2015/0222135 | A1 | 8/2015 | Lee |
| 2016/0116925 | A1* | 4/2016 | Freeman ........... H02M 3/33546 307/130 |

FOREIGN PATENT DOCUMENTS

TW    201312916 A1    3/2013

\* cited by examiner

*Primary Examiner* — Zixuan Zhou
(74) *Attorney, Agent, or Firm* — McClure, Qualey & Rodack, LLP

(57) ABSTRACT

An electronic device includes an energy storage unit, a charge pump circuit, a charging circuit, and a controller. The charge pump circuit is electrically connected to the power supply, and the power supply is configured to receive the input electrical energy. The charging circuit is electrically connected between the charge pump circuit and the energy storage unit. The controller is electrically connected with the power supply, the charge pump circuit, and the charging circuit respectively, and the controller controls the charge pump circuit and the charging circuit to switch among a plurality of charging modes according to compatibility information of the power supply.

4 Claims, 6 Drawing Sheets

ELECTRONIC DEVICE AND CHARGING METHOD THEREOF

CROSS-REFERENCE TO RELATED APPLICATION

This application claims the priority benefit of Taiwan application serial No. 105141265, filed on Dec. 13, 2016. The entirety of the above-mentioned patent application is hereby incorporated by reference herein and made a part of specification.

BACKGROUND OF THE INVENTION

Field of the Invention

The disclosure relates to an electronic device and, more particularly, to a charging circuit of an electronic device.

Description of the Related Art

Generally, in order to increase the charging speed of an electronic product, the current output of the power supply is increased. However, the input impedance loss of the electronic device is increased. Even if a high-efficiency charging system cooperates with the electronic device, the overall efficiency is decreased due to the high input impedance loss. The input impedance loss can be reduced by increasing the output voltage of the power supply. However, the voltage convert ratio of the charging system of the electronic device is increased. Furthermore, the power supply is easily overheated, and the efficiency is reduced.

BRIEF SUMMARY OF THE INVENTION

According to an aspect of the disclosure, an electronic device is provided. The electronic device comprises: an energy storage unit; a charge pump circuit, electrically connected to a power supply, and the power supply is configured to receive an input electrical energy; a charging circuit, electrically connected between the charge pump circuit and the energy storage unit; and a controller, electrically connected with the power supply, the charge pump circuit, and the charging circuit, respectively, the controller controls the charge pump circuit and the charging circuit to switch among a plurality of charging modes according to compatibility information of the power supply.

According to another aspect of the disclosure, a charging method for charging an energy storage unit of an electronic device is provided. The charging method comprises: providing an input electrical energy to an electronic device via a power supply; detecting whether the power supply supports a power delivery specification (PD); detecting whether the power supply includes a vendor defined message (VDM); and controlling the electronic device to switch among a plurality of charging modes according to whether the power supply supports the PD and whether the power supply includes the VDM.

In sum, electronic devices in embodiments can support higher watts in charging. The input impedance loss is reduced. Furthermore, with the configuration of the charge pump circuit, the voltage convert ratio of the charging circuit would not be too high. Therefore, the whole charging efficiency is high.

These and other features, aspects and advantages of the present disclosure will become better understood with regard to the following description, appended claims, and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion.

The terms "electrically connect" represent that two or more components are electrically connected with each other directly or indirectly.

Figure 1:
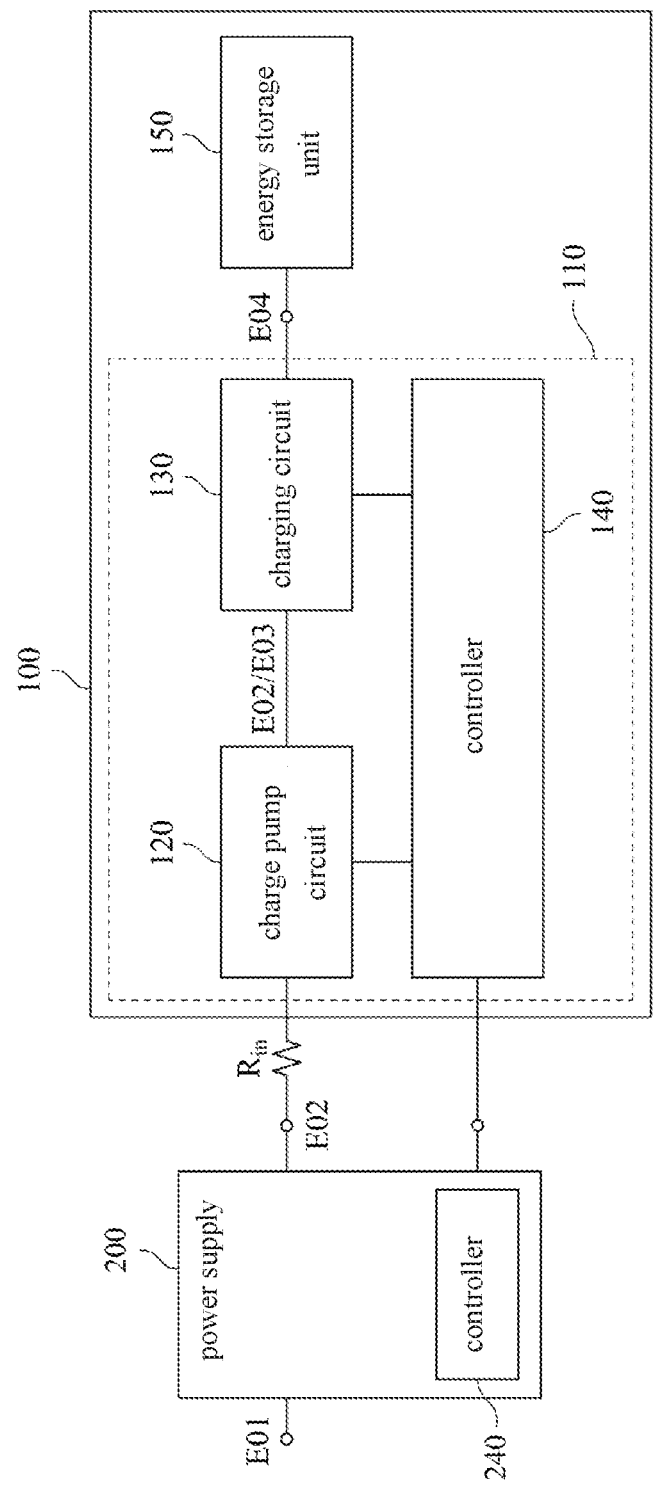
FIG. 1 is a schematic diagram of an electronic device in an embodiment.

Please refer to FIG. 1. FIG. 1 is a schematic diagram of an electronic device 100 and a power supply 200 connected to the electronic device 100 in an embodiment. In an embodiment, the electronic device 100 is a phone or a tablet. The electronic device 100 includes an energy storage unit 150. In an embodiment, the energy storage unit 150 is a rechargeable battery, such as a nickel-cadmium battery, a nickel-metal hydride battery, a lithium ion battery, or a lithium ion polymer battery.

The electronic device 100 includes a charging module 110 for charging the energy storage unit 150. In the embodiment, the charging module 110 of the electronic device 100 includes a charge pump circuit 120, a charging circuit 130, and a controller 140. One end of the charge pump circuit 120 is connected with the power supply 200, and the other end of the charge pump circuit 120 is connected with the charging circuit 130 in series. The controller 140 is electrically connected to the charge pump circuit 120, the charging circuit 130, and the power supply 200. In an embodiment, the controller 140 is a power management circuit, an integrated circuit with a charging control function, a processing circuit, or a central processing unit (CPU). In an embodiment, the controller 140 is a Configuration Channel Logic (CC Logic) chip.

The electronic device 100 charges the energy storage unit 150 via the external power supply 200. In an embodiment, the power supply 200 is a power adapter. One end of which is connected to a power socket to receives a voltage source E01. The voltage source E01 is converted to an input electrical energy E02 which is adapted to charge the electronic device 100. However, the power supply 200 is not limited in the power adapter. The power supply 200 is any device that can provide power to the electronic device 100. For example, the power supply 200 is a portable power pack or a wireless charging device. In an embodiment, the power supply 200 is electrically connected to the electronic device 100 via a USB type-C electrical wire to transfer the input electrical energy E02.

Generally, the charging socket of the electronic device 100 has a general specification, such as USB, thunderbolt, or FireWire specifications. In usage, an original power adapter, an original portable power pack, or an original wireless charging device is used to charge the electronic device 100, or power adapters, portable power packs, or wireless charging devices of other different brands are used to charge the electronic device 100. However, the power output characteristics of power adapters, portable power packs, or wireless charging devices of different brands are various, for example, some of which only support traditional constant output voltage and constant current charging (such as 5V1A, 5V2A), and some of which support the fast charge specification of which the voltage and the current is dynamically adjusted (such as specifications of Quick Charge 2.0, Quick Charge 3.0).

In the embodiment, for compatibly working with the different power supply adapters, portable power packs, or wireless charging devices, the charging module 110 is configured at the electronic device 100 to automatically switch between different charging modes according to different power supply 200. Then, the compatibility of the electronic device 100 cooperating with various power supplies 200 is improved. Furthermore, the charging efficiency and the safety in charging are improved, and the energy storage unit 150 would not be damaged due to a substandard power input.

The controller 140 of the electronic device 100 detects at least one of the compatibility information (for example, the type and power specification of the power supply 200) of the power supply 200 via the controller 240 of the power supply 200 to switch among a plurality of charging modes for the charge pump circuit 120 and the charging circuit 130. In one embodiment, the charging modes include a high-efficiency charging mode, a direct charging mode, and a normal charging mode.

The controller 140 of the electronic device 100 detects at least one of compatibility information of the power supply 200 via the controller 240 of the power supply 200. In this embodiment, the compatibility information includes whether the power supply 200 supports the Power Deliver specification (PD) and whether the power supply 200 contains a vendor defined message (VDM). In an embodiment, the VDM is a manufacturer identification (ID) message or a message to indicate a specific function of the power supply 200.

The controller 140 determines the charging mode according to whether the power supply 200 supports the PD and whether the power supply includes the VDM. Whether the charge pump circuit 120 and the charging circuit 130 are enabled is determined according to the charging mode.

Figure 2:
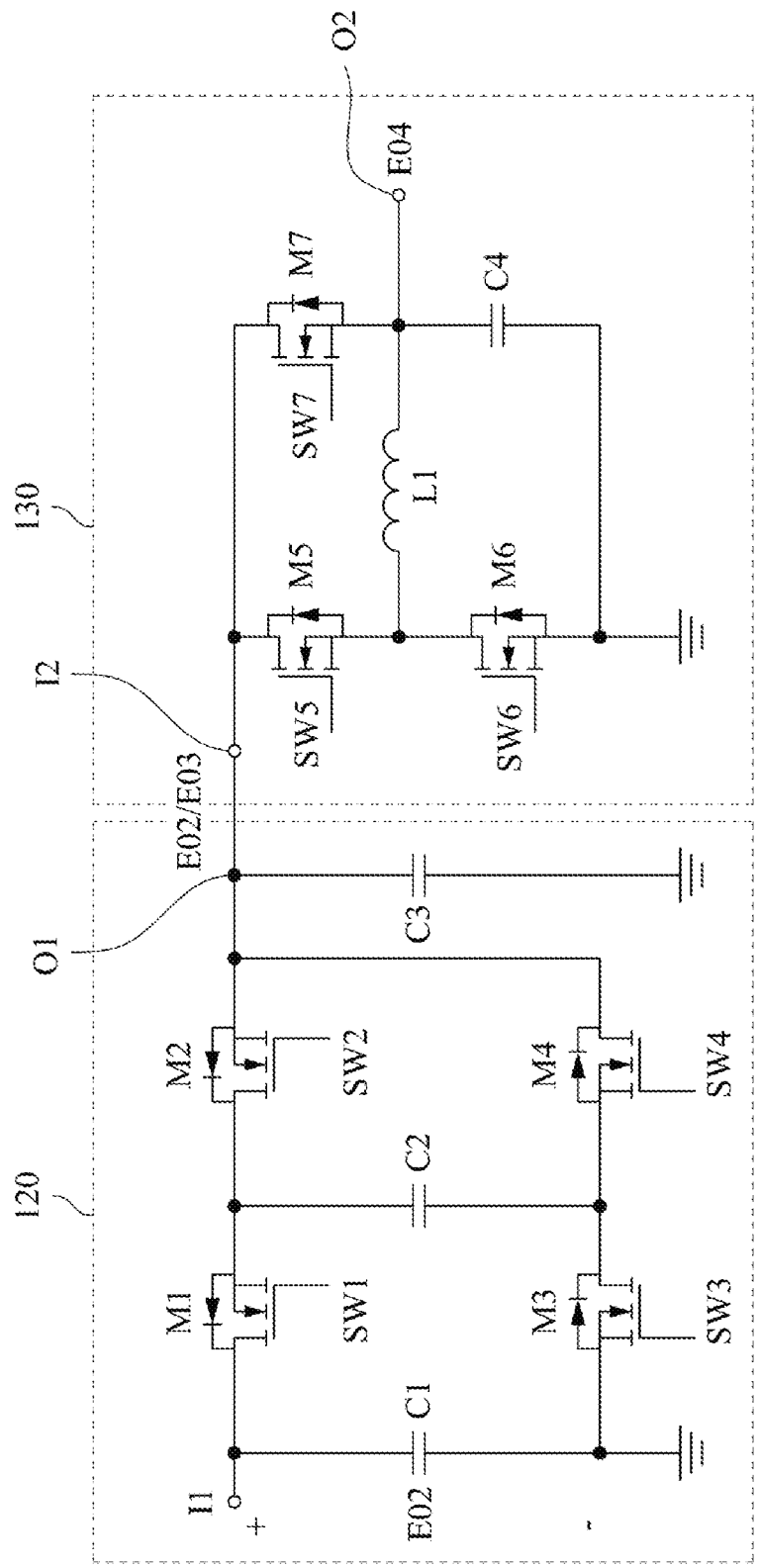
FIG. 2 is a schematic diagram of a charging module in an embodiment.

FIG. 2 is a schematic diagram of a circuit of the charge pump circuit 120 and the charging circuit 130 of the charging module 110 of the electronic device 100 in an embodiment. As shown in FIG. 2, the charge pump circuit 120 includes a first input terminal I1, a first output terminal O1, a first switch M1, a second switch M2, a third switch M3, a fourth switch M4, a first capacitor C1, a second capacitor C2, and a third capacitor C3. The first input terminal I1 receives an input electrical energy E02. The first output terminal O1 is connected to the charging circuit 130 to selectively output the input electrical energy E02 or a converted electrical energy E03 to the charging circuit 130. One end of the first capacitor C1 is electrically connected to the first input terminal I1, and the other end of the first capacitor C1 is grounded to stabilize the voltage of the input electrical energy E02. One end of the first switch M1 is electrically connected to an end of the first capacitor C1 which is connected to the first input terminal I1, and the other end of the first switch M1 is electrically connected to one end of the second capacitor C2. One end of the second switch M2 is electrically connected to the end of the second capacitor C2 which is connected to the first switch M1, and the other end of the second switch M2 is electrically connected to the first output terminal O1. One end of the third switch M3 is electrically connected to the other end of the second capacitor C2, and the other end of the third switch M3 is connected to ground. One end of the fourth switch M4 is electrically connected to the end of the second capacitor C2 which is connected to the third switch M3, and the other end of the fourth switch M4 is electrically connected to the end of the second switch M2 which is electrically connected to the first output terminal O1. One end of the third capacitor C3 is connected to the first output terminal O1, and the other end of the third capacitor C3 is grounded.

The charging circuit 130 includes a second input terminal I2, a second output terminal O2, a high side switch M5, a low side switch M6, a bypass switch M7, an output capacitor C4, and an inductor L1. The second input terminal I2 is electrically connected to a first output terminal of the charge pump circuit 120 to receive the input electrical energy E02 or the converted electrical energy E03 output from the charge pump circuit 120. The second output terminal O2 outputs the charging electrical energy E04. One end of the high side switch M5 is electrically connected to the second input terminal I2. One end of the low side switch M6 is electrically connected to the other end of the high side switch M5, and the other end of the low side switch M6 is grounded. The two ends of the bypass switch M7 are electrically connected to the second input terminal I2 and the second output terminal O2, respectively. Two ends of the inductor L1 are electrically connected to the second output terminal O2 and an end of the high side switch M5 which is connected to the low side switch M6, respectively. One end of the output capacitor C4 is electrically connected to the second output end O2, and the other end of the output capacitor C4 is grounded.

When the switch M7 in the charging circuit 130 is turned on, the two ends of the charging circuit 130 are short circuited. Then, the output of the charge pump circuit 120 is directly provided to the second input terminal I2, and the electrical energy received by the second input terminal I2 is directly into the second output terminal O2 to charge the energy storage unit 150 directly.

In embodiments, the switches M1 to M7 may be various types. In an embodiment, the switch is an NMOS transistor, a PMOS transistor, or a bipolar transistor. Each of the switches M1 to M7 includes a control terminal. Each of the switches M1 to M7 is controlled to turn on or turn off by the controller 140. In the embodiment, the controller 140 generates a plurality of control signals SW1 to SW7 to control the switches M1 to M7 to turn on or turn off.

When the charge pump circuit 120 is not actuated, the charge pump circuit 120 transfers the input electrical energy E02 directly to the charging circuit 130.

When the charge pump circuit 120 is actuated, the charge pump circuit 120 is adjusted to provide a specific converted electrical energy E03 by controlling the clock signal phase of the switches M1, M2, M3, and M4.

For example, when the charge pump circuit 120 is actuated, the controller 140 controls the clock of the control signals SW1 and SW4 of the switches M1 and M4 to have a same phase, and controls the clock of the control signals SW2 and SW3 of the switches M2 and M3 to have a same phase. The phases of the control signals SW1 and SW4 are opposite to the phases of the control signals SW2 and SW3. Thus, the switches M1, M4 and the switches M2, M3 are turned on and off in turn. For example, in the first half of the clock cycle, the switches M1 and M4 are turned on, and the switches M2 and M3 are turned off. In the latter half of the same clock cycle, the switches M1 and M4 are turned off and the switches M2 and M3 are turned on. The capacitance C1, C2 is charged and discharged by controlling the switches M1 to M4.

Since the switches M1, M4 and the switches M2, M3 are turned on and off in turn, the voltage of the converted electrical energy E03 is half of the voltage of the input electrical energy E02. Without the consideration of the conversion loss, the current of the converted electrical energy E03 is two times of the current of the input electrical energy E02.

For example, when the voltage and the current of the input electrical energy E02 is 5V and 1 A, the input electrical energy E02 is converted to the converted electrical energy E03 with 2.5V and 2 A by the charge pump circuit 120. When the voltage and the current of the input electrical energy E02 is 12V and 1.5 A, the input electrical energy E02 is converted to the converted electrical energy E03 with 6V and 3A by the charge pump circuit 120.

If the input electrical energy E02 provided by the power supply 200 has a high voltage (such as 12V and 1.5 A), the charge pump circuit 120 is utilized to decrease the voltage to generate the converted electrical energy E03 of 6V and 3 A. Then, the voltage convert ratio of the charging circuit 130 received at the converted electrical energy E03 is decreased.

With above circuit configuration and the operations, the charging efficiency of the energy storage unit 150 is improved. In an embodiment, the maximum input power supported by the energy storage unit 150 is 4V and 6 A, however, the maximum current supported by components at the charging path of the electronic device 100 is 3 A, the power supply 200 with 8V and 3 A can be used. The input power of 8V and 3 A is converted to an output power of 4V and 6 A via the charge pump circuit 120. Therefore, the damage of the electronic device 100 is avoided, and the energy storage unit 150 is charged with the maximum power.

In the embodiment of FIG. 2, the charging circuit 130 adjusts the converted electrical energy E03 or the input electrical energy E02 to generate the charging electrical energy E04 via the inductor L1 and the capacitance C4 to charge the energy storage unit 150. According to the charging electrical energy E04 and the charging current Tout for the energy storage unit 150, the controller 140 adjusts the charging electrical energy E04 generated from the charging circuit 130 by adjusting the control signals SW5, SW6 of the switches M5, M6 of the charging circuit 130 via the Pulse Width Modulation (PWM). Then, the charging module 110 is charged in a constant voltage (CV)/constant current (CC) mode.

In an embodiment, the controller 140 controls the duty cycle of the control signal SW5 of the switch M5 to be D, and the duty cycle of the control signal SW6 of the switch M6 is complementary with the duty cycle of the control signal SW5 (1-D). That is, the switches M5 and M6 are turned on in turn. When the converted electrical energy E03 or the input electrical energy E02 is provided to the charging circuit 130, and when the switch M5 is turned on and the switch M6 is turned off, the inductor L1 is charged via the converted electrical energy E03 or the input electrical energy E02. When the switch M6 is turned on and the switch M5 is turned off, the inductor L1 releases the energy to charge the capacitance C4.

When the charge pump circuit 120 is actuated to generate the converted electrical energy E03, the voltage of the charging electrical energy E04 is equal to the value of the voltage of the charging electrical energy E03 multiplying the duty cycle D. When the charge pump circuit 120 is not actuated, the voltage of the charging electrical energy E04 is equal to the value of the voltage of the input electrical energy E02 multiplying the work cycle D.

In the constant current mode, if the output current of the charging circuit 130 does not reach a preset current value, the work cycle D should be increased, and vice versa. In the constant current mode, when the demand of the input wattage increases, the duty cycle D is increased gradually. When the energy storage unit 150 enters in the constant voltage mode, the duty cycle D should be increased if the charging electrical energy E04 is lower than the preset voltage; otherwise, the duty cycle D is decreased. In the constant voltage mode, since the current becomes smaller, the duty cycle D is gradually decreased.

In an embodiment, the power supply 200 includes the controller 240. The controller 240 includes a voltage sensing circuit for sensing the value of an output voltage $V_{AD}$ and/or a current sensing circuit for sensing the value of an output current $I_{AD}$. Practically, the connecting circuit between the power supply 200 and the electronic device 100 has an equivalent impedance $R_{in}$.

Figure 3:
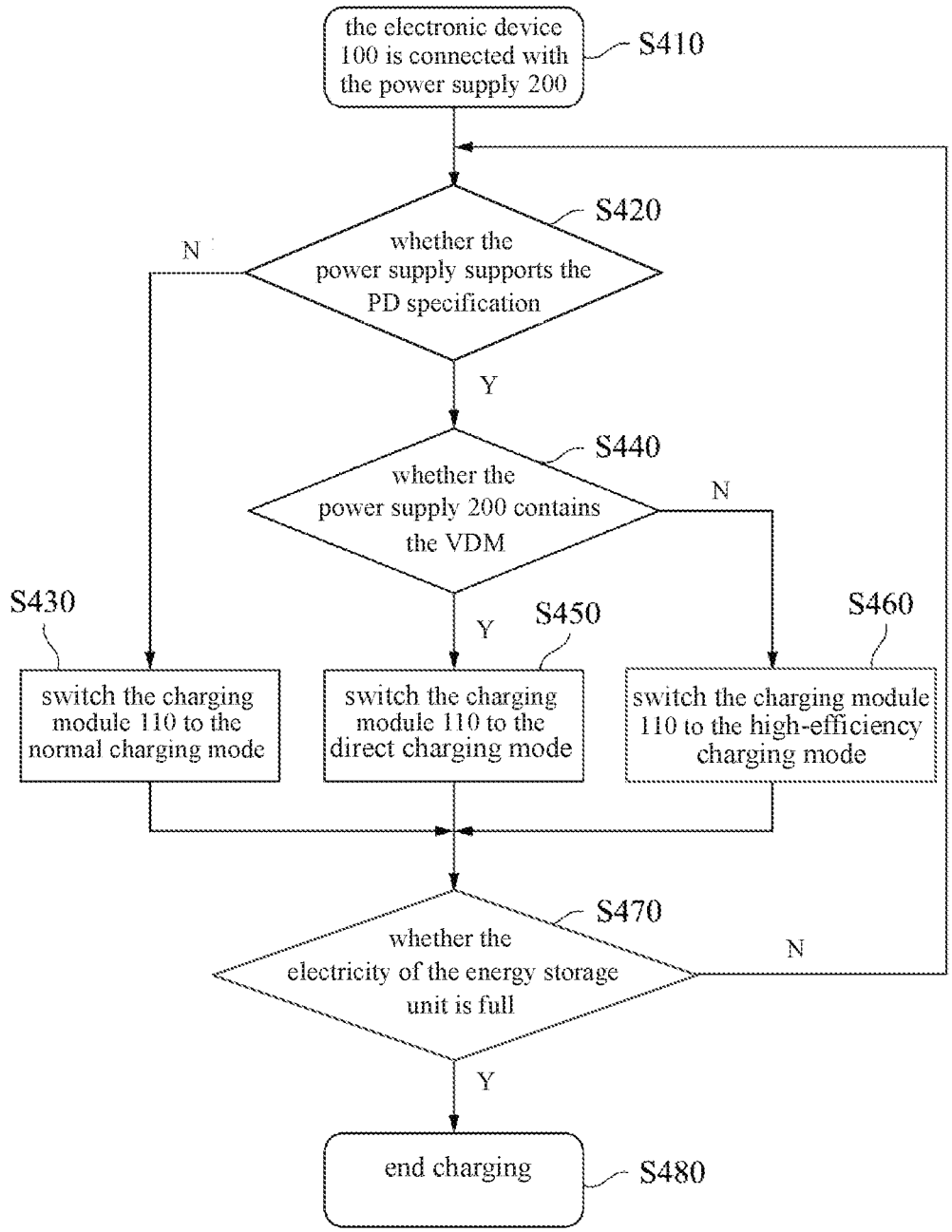
FIG. 3 is a flowchart of a charging method in an embodiment.

Please refer to FIG. 3. FIG. 3 is a flowchart of a charging method 400 in an embodiment. In step S410, the electronic device 100 is connected with the power supply 200. In step S420, the controller 140 detects whether the power supply supports the power delivery specification (a PD specification) via the controller 240.

When the power supply 200 does not support the PD specification, step S430 is executed. The power supply 200 switches the charging module 110 to the normal charging mode. Then, the charge pump circuit 120 is not actuated and the charging circuit 130 is actuated. Two ends of the charge pump circuit 120 are conducted, and the input electrical energy E02 is transferred to the charging circuit 130. The charging circuit 130 adjusts the voltage of the input electrical energy E02 to generate the charging electrical energy E04 and outputs the charging electrical energy E04 to the energy storage unit 150. The energy storage unit 150 is charged by the charging electrical energy E04.

In the normal charging mode, the charge pump circuit 120 is not actuated, the switches M1, M2, M3 of the charge pump circuit 120 keep turned on, and the switch M4 is turned off. The input electrical energy E02 from the power supply 200 directly enters to the charging circuit 130 without being converted.

When the power supply 200 supports the PD specification, in step S440 is executed, whether the power supply 200 contains the VDM is detected.

When the power supply 200 contains the VDM, step S450 is executed, the charging module 110 is switched to the direct charging mode. Then, the charge pump circuit 120 is actuated, and the charging circuit 130 is not actuated. The charge pump circuit 120 converts the input electrical energy E02 to the converted electrical energy E03. Two ends of the charging circuit 130 are connected, and the converted electrical energy E03 is output to the energy storage unit 150. The energy storage unit 150 is charged via the converted electrical energy E03.

When the charging module 110 is in the direct charging mode, the controller 140 does not actuate the charging circuit 130. The switches M5, M6 of the charging circuit 130 keep off, and the switch M7 keeps on. The controller 140 determines whether to convert the input electrical energy E02 via the charge pump circuit 120 according to the value of the input electrical energy E02 provided by the power supply 200.

In the direct charging mode, when the voltage of the input electrical energy E02 is higher than the preset threshold voltage value, the controller 140 controls the charge pump circuit 120 to convert the input electrical energy E02 to the converted electrical energy E03, and the converted electrical energy E03 charges the energy storage unit 150 via the charging circuit 130. When the voltage of the input electrical energy E02 is lower than the preset threshold voltage value, both the charge pump circuit 120 and the charging circuit 130 are not actuated, and the charging module 110 directly outputs the input electrical energy E02 (as the output charging electrical energy E04) without being converted to charge the energy storage unit 150. The threshold voltage value is set according to the withstanding voltage of the energy storage unit 150, the charging module 110, or the charging circuit.

When the power supply 200 does not include the VDM, in step S460, the charging module 110 is switched to the high-efficiency charging mode. When the controller 140 switches the charge pump circuit 120 and the charging circuit 130 to the high-efficiency charging mode, the charge pump circuit 120 and the charging circuit 130 are actuated. The charge pump circuit 120 converts the input electrical energy E02 to the converted electrical energy E03. The charging circuit 130 receives the converted electrical energy E03 and adjusts the voltage of the converted electrical energy E03 to generate the charging electrical energy E04 to charge the energy storage unit 150.

Then, the energy storage unit 150 is charged according to the charging mode. In step S470, whether the electrical energy of the energy storage unit 150 is full is determined. If the electrical energy is full, the charging is stopped in the step S480. If the electrical energy is not full, the step S420 is repeated to detect and charge.

Figure 4:
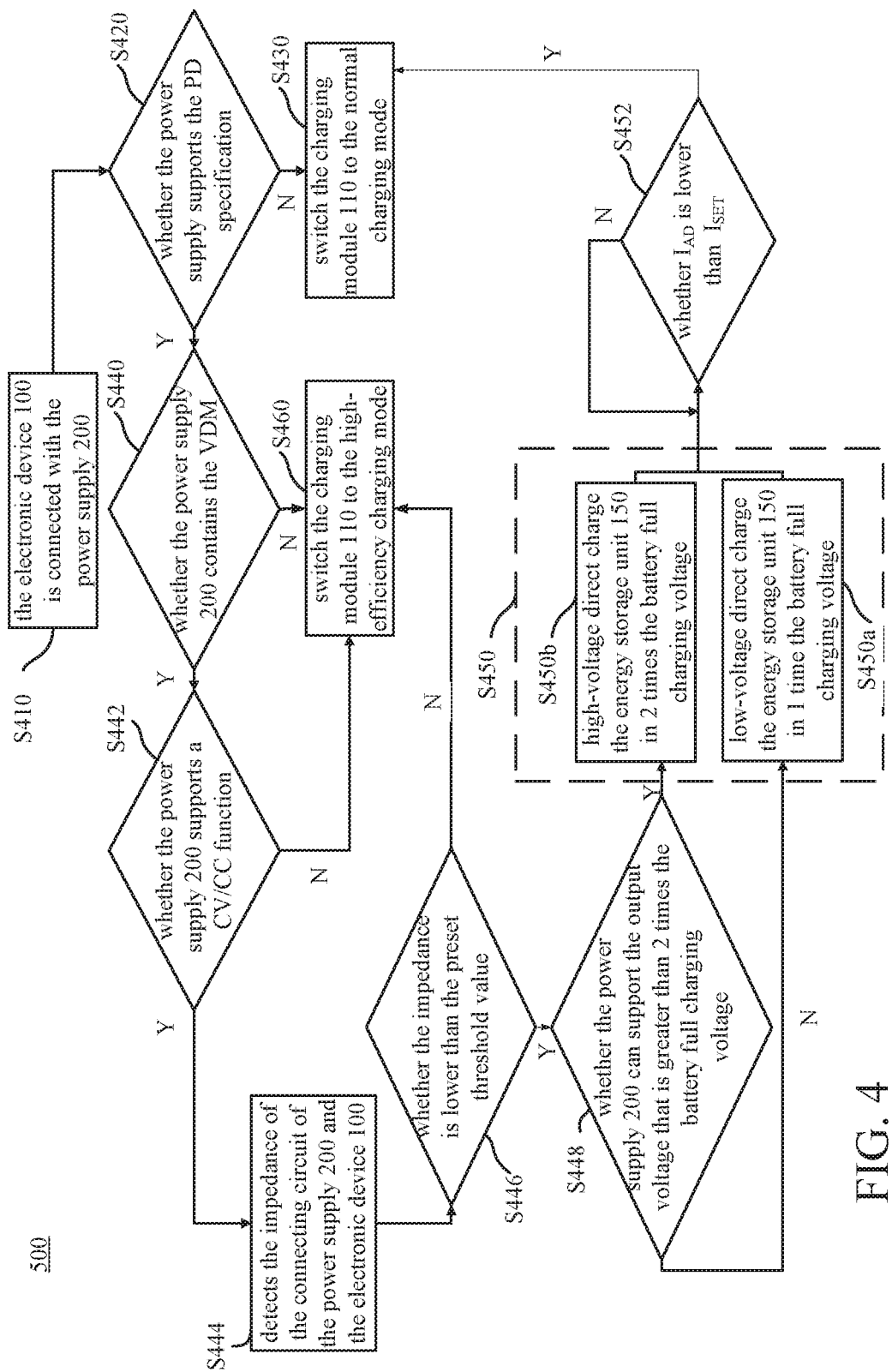
FIG. 4 is a flowchart of a charging method in an embodiment.

In an embodiment, the direct charging mode (step S450) is divided into a high-voltage direct charging mode and a low-voltage direct charging mode. Please refer to FIG. 4. FIG. 4 is a flowchart of a charging method 500 in an embodiment. Comparing with the charging method 400, the charging method 500 further includes step S442, step S444, step S446, step S448, and step S452. The step S450 further includes substeps S450a and step S450b. First, in the charging method 500, the electronic device 100 is connected to the power supply 200 in the step S410. Then, the controller 140 detects whether the power supply 200 supports the power delivery specification (PD) via the controller 240 in the step S520. When the power supply 200 does not support the power delivery specification (PD), the charging module 110 is switched to the normal charging mode in the step S430. The description of the normal charging mode can refer to above paragraphs, which is omitted herein. When the power supply 200 supports the PD, whether the power supply 200 includes the VDM is further detected in the step S440.

When the power supply 200 does not include the VDM, the charging module 110 is switched to the high-efficiency charging mode in the step S460. The description of the high-efficiency charging mode can refer to above paragraphs, which is omitted herein. When the power supply 200 includes the VDM, whether the electronic device 100 is adapted to be charged via the high-voltage direct charging mode or the low-voltage direct charging mode is further determined via the steps S442-S448. Whether the power supply 200 supports a constant voltage and constant current (CV/CC) function is further detected in the step S442. When the power supply 200 does not support the CV/CC function, the charging module 110 is switched to the high-efficiency charging mode in step S460.

When the power supply 200 supports the CV/CC function, the step S444 is executed. The controller 140 detects the impedance of the connecting circuit between the power supply 200 and the electronic device 100 to determine the proper input electrical energy E02. The equivalent impedance $R_{in}$ of the circuit is determined as follows. The charging circuit 130 of the electronic device 100 is not actuated (that is, the switch M7 is conducted), the equivalent impedance $R_{in}$ of the circuit is calculated according the output voltage $V_AD$, the output current $I_{AD}$ of the power supply 200 and the input voltage $V_{in}$ received by the electronic device 100 via the formula: $R_{in}=(V_{in}-V_{AD})/I_{AD}$. The controller 140 sets the output voltage $V_{AD}$ and the output current $I_{AD}$ of the power supply 200 via the controller 240. The input voltage $V_{in}$ is measured by the controller 240. For example, when the output current $I_{AD}$ is 1 A, the impedance $R_{in}=(V_{in}-V_{AD})$.

After the impedance $R_{in}$ is calculated out, whether the impedance $R_{in}$ is higher than the preset threshold value (such as 250 m ohm) is determined in the step S446. When the impedance $R_{in}$ is higher than the preset threshold value, the charging module 110 is switched to the high-efficiency charging mode in the step S460. When the impedance $R_{in}$ is lower than the preset threshold value, the step S448 is executed. The power supply 200 is set to the CV mode. The output voltage supported by the power supply 200 is determined. If the output voltage supported by the power supply 200 is not higher than 2 times of the battery full charging voltage, the step S450a is executed. The energy storage unit 150 is charged in the low-voltage direct charge mode with 1 times of the battery full charging voltage. If the output voltage supported by the power supply 200 is higher than 2 times of the battery full charging voltage, the step S450b is executed. The charge pump circuit 120 is actuated, the charging circuit 130 does not to operate (the switch M7 is conducted). The energy storage unit 150 is charged in the high-voltage direct charge mode with 2 times of the battery full charging voltage.

After the power supply 200 is switched from CC mode to the CV mode, the energy storage unit 150 does not need to be charged with a high current, the output current $I_{AD}$ and the end-of-charge current $I_{SET}$ is compared. The end-of-charge current $I_{SET}$ is the lowest current threshold value in the direct charging mode. In step S452, whether the output current $I_{AD}$ of the power supply 200 in the CV mode is lower than the end-of-charge current $I_{SET}$ is determined. If the output current $I_{AD}$ is lower than the end-of-charge current $I_{SET}$, back to the step S430. The charging module 110 is switched to the normal charging mode. That is, the charge pump circuit 120 is not actuated, and the charging circuit 130 is actuated.

In an embodiment, the charging module 110 of the electronic device 100 further includes a second charge pump circuit (not shown in the figure). The second charge pump circuit includes the same circuit architecture with the charge pump circuit 120, and the second charge pump circuit is also controlled by the controller 140. The second charge pump circuit is set in front of the charging circuit 130, and the second charge pump circuit is connected with the charge pump circuit 120 and the charging circuit 130 in series. Therefore, the voltage of the input electrical energy E02 of the power supply 200 is reduced twice via the charge pump circuit 120 and the second charge pump circuit. For example, the voltage of the converted electrical energy E03 is reduced to half via the charge pump circuit 120, and is further reduced to half via the second charge pump circuit. Then, the voltage of the converted electrical energy E03 is 0.25 times of the original voltage of the input electrical energy E02. Without the consideration of the circuit conversion loss, the current of the converted electrical energy E03 is four times of the current of the original input electrical energy E02.

In an embodiment, the charging module 110 of the electronic device 100 includes two or more charge pump circuits. With the charge pump circuits connected in series, the charging module 110 of the electronic device 100 can reduce the voltage of the input electrical energy E02 greatly. Thus, the power supply 200 with higher watts (or with a higher input voltage) can be used.

Figure 5:
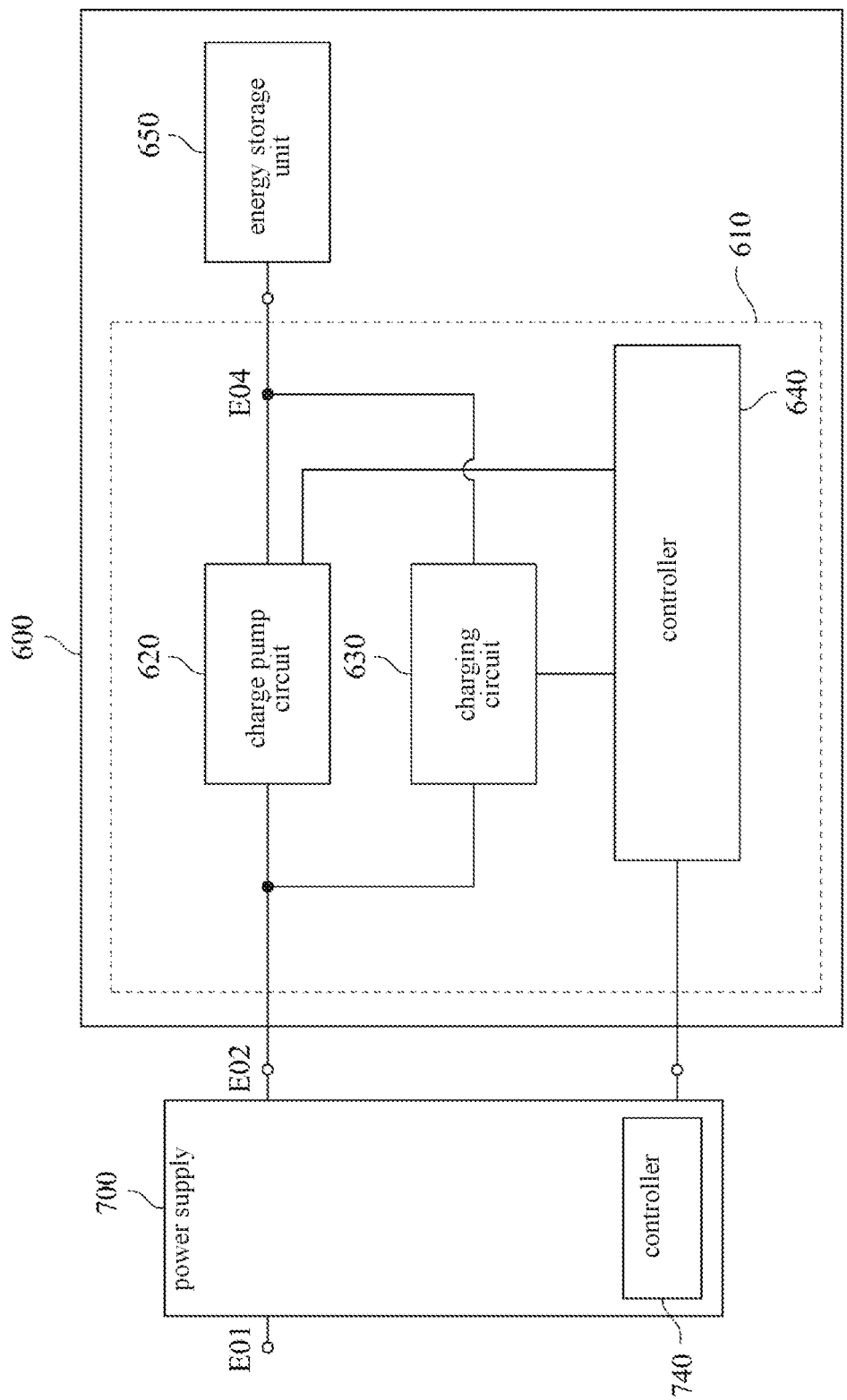
FIG. 5 is a schematic diagram of an electronic device in an embodiment.

In an embodiment, the power supply has the CV/CC function. Then, the charging modules of the electronic device can be connected in parallel, as shown in FIG. 5. FIG. 5 is a schematic diagram of an electronic device 600 in an embodiment. The electronic device 600 includes a charging module 610 and an energy storage unit 650. The charging module 610 includes a charge pump circuit 620, a charging circuit 630, and a controller 640.

In the embodiment, the charge pump circuit 620 is connected with the charging circuit 630 in parallel. The controller 640 is electrically connected with the charge pump circuit 620 and the charging circuit 630, respectively. The power supply 700 is configured to charge the energy storage unit 650 of the electronic device 600. The power supply 700 supports the CV/CC function and includes a controller 740. The charge pump circuit 620, the controller 640, and the energy storage unit 650 are the same as the charge pump circuit 120, the controller 140, and the energy storage unit 150 of the electronic device 100.

In the embodiment, since the power supply 700 includes the CV/CC function, the controller 140 of the electronic device 100 does not need to adjust the control signals SW5 and SW6 of the switches M5, M6 via the PWM. Therefore, the switches M5, M6 do not need to be configured in the charging circuit 630 of the electronic device 600.

When the power supply 700 is connected with the charge pump circuit 620, the controller 640 turns off the charging circuit 630. The energy storage unit 650 is charged with the input electrical energy E02 in a constant current mode via the charge pump circuit 620. When the energy storage unit 650 is charged to a certain degree and is changed to be charged in the CV mode, the controller 640 turns off the charge pump circuit 620 and actuates the charging circuit 630, the input electrical energy E02 is used to charge the energy storage unit 650 via the charging circuit 630 to achieve the best charging efficiency.

Figure 6:
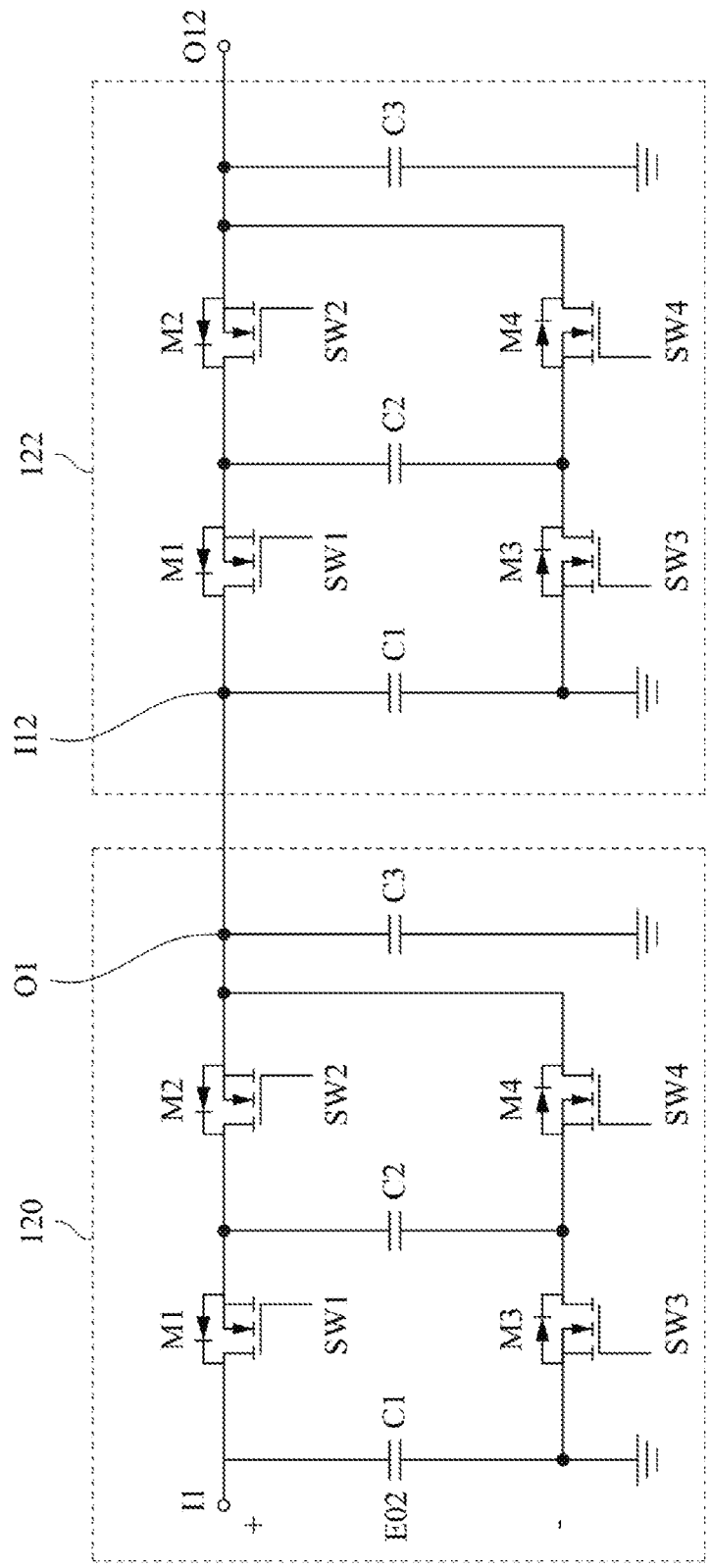
FIG. 6 is a schematic diagram of a charging module in an embodiment.

In an embodiment, the charging module 110 of the electronic device 100 further includes a second charge pump circuit, as shown in FIG. 6. The second charge pump circuit 122 has the same circuit architecture as that of the charge pump circuit 120. The second charge pump circuit 122 is also controlled by the controller 140. The second charge pump circuit 122 is connected with the charge pump circuit 120 in parallel. The input end 112 of the second charge pump circuit 122 is connected with the first output end O1 of the charge pump circuit 120. The output end O12 of the second charge pump circuit 122 is configured for outputting the converted electrical energy E03. Therefore, the input electrical energy E02 supplied from the power supply 160 is reduced twice via the charge pump circuit 120 and the second charge pump circuit 122. In an embodiment, the voltage of the converted electrical energy E03 is reduced to half via the charge pump circuit 120, and then reduced to half via the second charge pump circuit 122. Then, the voltage of the converted electrical energy E03 is equal to $(0.5)^2$ of the original input electrical energy E02. Therefore, the current of the converted electrical energy E03 to the charging circuit 130 is 4 times of the original input electrical energy E02.

In an embodiment, the charging module 110 of the electronic device 100 includes two or more charge pump circuits. As stated above, when two charge pump circuits are connected in series, the voltage is reduced by $(0.5)^2$ times, and so on. When the number K charge pump are connected circuits in series, the voltage is reduced by $(0.5)^K$, wherein K is a positive integer. With more charge pump circuits connected in series in the charging module 110 of the electronic device 100, the voltage of the input electrical energy E02 is reduced greatly, and thus the power supply 160 with higher watts can be selected.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:
1. An electronic device comprising:
an energy storage unit;
a charge pump circuit, electrically connected to a power supply to receive an input electrical energy from the power supply, wherein the charge pump circuit selectively directly outputs the input electrical energy or converts the input electrical energy to a converted electrical energy to a converted electrical energy to output;
a charging circuit, electrically connected between the charge pump circuit and the energy storage unit to receive the input electrical energy or the converted electrical energy; and
a controller, electrically connected with the power supply, the charge pump circuit, and the charging circuit, respectively, the controller controls the charge pump circuit and the charging circuit to switch among a plurality of charging modes according to compatibility information of the power supply;
wherein the charging modes further include a normal charging mode, when the controller switches the charge pump circuit and the charging circuit to the normal charging mode, the charge pump circuit is not actuated and the charge pump circuit directly transfers the input electrical energy to the charging circuit, and the charging circuit adjusts the voltage of the input electrical energy to generate and output a charging electrical energy to the energy storage unit, and the energy storage unit is charged via the charging electrical energy.

2. The electronic device according to claim 1, wherein the charging modes includes a high-efficiency charging mode, when the controller switches the charge pump circuit and the charging circuit to the high-efficiency charging mode, the charge pump circuit converts the input electrical energy into the converted electrical energy to output, and the charging circuit receives the converted electrical energy and adjusts a voltage of the converted electrical energy to generate the charging electrical energy to charge the energy storage unit.

3. The electronic device according to claim 1, wherein the charging modes further include a direct charging mode, when the controller switches the charge pump circuit and the charging circuit to the direct charging mode, the charging circuit is not actuated and the charge pump circuit converts the input electrical energy into the converted electrical energy to transfer to the charging circuit, wherein the charging circuit directly outputs the converted electrical energy to the energy storage unit, and the energy storage unit is charged via the converted electrical energy.

4. The electronic device according to claim 1, wherein the controller is configured to detect whether the power supply supports the power delivery specification (PD) and whether the power supply includes a vendor defined message (VDM), and the controller controls the electronic device switch among the charging modes accordingly.

\* \* \* \* \*